(12) United States Patent
Ronaldson et al.

(10) Patent No.: US 7,698,099 B2
(45) Date of Patent: Apr. 13, 2010

(54) RELATING TO MONITORING

(75) Inventors: John Paul Ronaldson, Cumbria (GB); John Adrian Lightfoot, Cumbria (GB)

(73) Assignee: VT Nuclear Services Limited, Southampton, Hampshire (GB)

( * ) Notice: Subject to any disclaimer, the term of this patent is extended or adjusted under 35 U.S.C. 154(b) by 717 days.

(21) Appl. No.: 11/395,461

(22) Filed: Mar. 31, 2006

(65) Prior Publication Data

US 2006/0219518 A1 Oct. 5, 2006

(30) Foreign Application Priority Data

Mar. 31, 2005 (GB) .................................. 0506605.5

(51) Int. Cl.
*G06F 17/18* (2006.01)

(52) U.S. Cl. .................................................... 702/181

(58) Field of Classification Search .................. 702/181
See application file for complete search history.

(56) References Cited

U.S. PATENT DOCUMENTS

| | | | |
|---|---|---|---|
| 3,792,470 A | 2/1974 | Donovan et al. | |
| 3,902,478 A | 9/1975 | Konopasek et al. | |
| 4,391,646 A | 7/1983 | Howell | |
| 4,396,976 A | 8/1983 | Hyatt | |
| 4,402,054 A | 8/1983 | Osborne et al. | |
| 4,568,514 A | 2/1986 | Lingren et al. | |
| 4,677,300 A | 6/1987 | Tawil et al. | |
| 4,874,951 A | 10/1989 | Gold et al. | |
| 4,931,646 A | 6/1990 | Koechner | |
| 4,988,988 A | 1/1991 | Kimura | |
| 5,005,142 A | 4/1991 | Lipchak et al. | |
| 5,347,129 A | 9/1994 | Miller et al. | |
| 5,399,869 A | 3/1995 | Usuda | |
| 5,430,663 A | 7/1995 | Judd et al. | |
| 5,541,415 A | 7/1996 | Shonka | |
| 5,854,994 A | 12/1998 | Canada et al. | |
| 6,912,485 B2 * | 6/2005 | Lightfoot et al. | ............ 702/188 |
| 7,265,353 B2 * | 9/2007 | Evans | ........................ 250/366 |
| 2003/0115154 A1 * | 6/2003 | Anderson et al. | ............. 705/73 |

FOREIGN PATENT DOCUMENTS

WO    WO 2006/022796 A1    3/2006

OTHER PUBLICATIONS

G.J. Arnone, *A New Pulse Arrival-Time Recording System*, IEEE, Jan. 1997, pp. 40-43.

G.J. Arnone, et al., *A New Pulse Arrival-time Recording Module for analyzing Neutron Multiplicities*, 1992 IEEE Nuclear Science Symposium, Oct. 1992.

(Continued)

*Primary Examiner*—Aditya Bhat
(74) *Attorney, Agent, or Firm*—Workman Nydegger

(57) ABSTRACT

A method of monitoring radioactive emissions which includes obtaining a data set, the data set including a record of an event together with an indication of the time of the event and/or the detector which detected the event. The method also includes processing the data set by analyzing the whole of the data set according to a first set of criteria to provide a first analysed data set and analysing the whole of the data set according to a second set of criteria to provide a second analysed data set, one or more criteria of the second set being different to the criteria of the first set. The first set of criteria and the second set of criteria both include a first time period and a second time period.

8 Claims, 1 Drawing Sheet

OTHER PUBLICATIONS

M. Bruggeman, et al., *Non-Destructive Assay with Computed Neutron Coincidence Counting,* Conference: Radioactive Waste Products-International Seminar; 3rd Schriften-Forschungszentrum Julich Reihe, 1998; vol. 2, pp. 253-256.

Guide Technology Incorporated,*Mechanical System Measurements Using the GT650 Series Time Interval Analyzers,* May 30, 1994.

Guide Technology Incorporated, GT657, GT659 16-CH. *Time Interval Analyers,* Jul. 29, 1997.

* cited by examiner

RELATING TO MONITORING

CROSS-REFERENCE TO RELATED APPLICATIONS

This application claims priority to United Kingdom Patent Application No. GB 0506605.5, filed Mar. 31, 2005, the disclosure of which is incorporated herein by reference.

BACKGROUND OF THE INVENTION

1. The Field of the Invention

This invention concerns improvements in and relating to monitoring, and in particular, but not exclusively, in relation to monitoring of radioactive materials.

2. The Relevant Technology

WO00/67044 provides an improved method for collecting information on emissions arising from radioactive materials. The present invention concerns developments in the processing of such information and/or the uses to which it can be put.

SUMMARY OF THE INVENTION

According to a first aspect of the invention we provide a method of monitoring, the method including:
  obtaining a data set, the data set including a record of an event, together with an indication of the time of the event and/or the detector which detected the event;
  processing the data set, the processing including the analysis of at least a part of the data set according to a first set of criteria to provide a first analysed data set and analysing at least a part of the data set according to a second set of criteria to provide a second analysed data set, one or more criteria of the second set being different to the criteria of the first set.

The method may include the review of the first analysed data set and the second analysed data set. The review may be followed by the selection of one of the analysed data sets in preference to the other. The selection may be of the best analysed data sets. The best analysed data set may be established by considering one or more factors. The factors may include the error and/or uncertainty. The selected analysed data set may be used to provide information on the monitored events, such as the location and/or activity and/or material make up and/or mass responsible for the emissions.

The method may include the use of both the first and second analysed data sets.

The event may be a detected emission, for instance a neutron, from a radioactive material. The time of the event may be recorded relative to a reference time and/or relative to a clock time. The time of the event may be noted by a time stamper.

The detector is preferably a detector for one or more of alpha and/or beta and/or gamma and/or neutron and/or x-ray emissions and/or radioactive decay, directly or indirectly.

The data set may be obtained according to the method of WO00/67044 the contents of which are incorporated herein by reference, particularly in respect of the method of event monitoring and the signal output arising therefrom.

The processing of the data may occur whilst the data set is being obtained and/or after the data set has been obtained. The processing may occur online and/or offline. The data set may be obtained from a single monitoring operation and/or may be obtained by combining the data sets from two or more monitoring operations.

The processing using the first set of criteria and the second set of criteria may be performed sequentially and/or in parallel.

Preferably the whole of the data set is analysed. The analysis may consider only some of the data types within the data set. For instance, the event and its time may be considered, but without considering the detector which detected the event.

One or more of the criteria may relate to a time period. The criteria may be the time between an occasion and the start of the time period and/or the time between an occasion and the end of the time period and/or the time period between the start of the time period and the end of the time period. The time period may be a gate and/or be defined by one or more gates.

The first set of criteria may include a first length of time between the start of a time period and the end of a time period. The second set of criteria may include a second different length of time between the start of the time period and the end of the time period. One or more further sets of criteria may be provided with different lengths of time between the start of the time period and the end of the time period, ideally with each time period different.

The events falling within the first set of criteria and/or second set of criteria time period may be considered. Preferably the events falling within the time period of each of the sets of criteria are considered.

The first set of criteria may include a first length of time between an occasion and the start of a time period and/or an occasion and the end of a time period. The second set of criteria may include a second different length of time between the occasion and the start of the time period and/or the occasion and the end of the time period. One or more further sets of criteria may be provided with different lengths of time between the occasion and the start of the time period and/or the occasion and the end of the time period, ideally with each time period different.

The events falling within the time period defined by the start and/or stop time of the first set of criteria and/or the second set of criteria may be considered. Preferably the events falling within the time period defined by the start and/or stop time of each of the sets of criteria are considered.

The first and/or second and/or further sets of criteria may include a first time period and a second time period defined in any of the above mentioned ways. The first time period may be a measure of the real and accidental coincidences in the events, with the second time period being a measure of the accidental coincidences.

The distribution of the number of events falling within the time period(s) may be considered and in particular the integrated probability density functions may be considered, ideally between the different time periods. This process may be applied in respect of a first time period and a second later time period in respect of each set of criteria. The distributions, such as histograms, for both time periods can be deconvoluted, preferably with respect to each set of criteria, potentially to produce multiple real coincidence vectors. The distributions may be modelled using a single equation giving the gate response probability distribution frequency as a function of time. For double coincidences, potentially assuming the die away time is $\tau$, then the measured pdf $fRA_t$ of real plus accidental coincidence events at time t is modelled as the addition of fR(t) and fA probability terms:

$$fRA_t = fR \cdot \exp\left(\frac{t}{\tau}\right) + fA$$

The terms fR and fA are obtained by regression analysis.

The selected set of criteria may be selected to give a length of time between an occasion and the start of a time period and/or a length of time between an occasion and the end of a time period and/or length of time period which excludes times at which only accidental coincidences occur and/or at which real coincidences occur below a threshold rate. The selected criteria may be selected to give a length of time between an occasion and the start of a time period and/or a length of time between an occasion and the end of a time period and/or length of time period which gives a required level of certainty, for instance in the real coincidence rate. The selected criteria may be selected to give a length of time between an occasion and the start of a time period and/or a length of time between an occasion and the end of a time period and/or length of time period which matches the die away time for the monitored location and/or chamber.

The first set of criteria and/or second set of criteria and/or one or more further sets of criteria may be applied to all the data in the data set. In one preferred embodiment, however, different sets of criteria are applied to the events detected by different detectors. Thus the first set of criteria may be applied to events detected by a first detector, the second set of criteria to events detected by a second detector, and potentially so on for other detectors. Thus the first set of criteria may be applied to events detected by a first type of detector, the second set of criteria to events detected by a second type of detector, and potentially so on for other types of detectors. Thus the first set of criteria may be applied to events detected by detectors in a first location or type of location, the second set of criteria to events detected by detectors in a second location or type of location, and potentially so on for locations and/or other types of location. The sets of criteria may be used to account for different detector types and/or designs and/or locations and/or materials being monitored. The sets of criteria may be used to apply different time periods and/or time period starts and/or time period stops to different detectors and/or detector types and/or detector locations and/or location types. The criteria may be different correction factors. The correction factors may account for observed count history and/or observed dead time for one or more individual detectors or groups of detectors.

The first set of criteria may be the time between an event and an event which is n events later, where n is a positive integer. The second set may be the time between an event and an event which is m events later, where m is a positive integer and is different to n. Preferably n is 1 and/or m is 2. One or more further sets of criteria may be provided where the criteria is the time between an event and an event which is number of events later, where the number of events is different to the number in the other criteria. Preferably sets of criteria where the number is 3 and/or 4 and/or 5 are provided. Preferably the distribution of the times determined is established in respect of one or more and preferably each of the sets of criteria. The different criteria and/or their distributions may reflect the multiplicity of the events.

The first set of criteria may be the one or more detectors forming a set of detectors. The second set of criteria may be the one or more detectors forming a different set of detectors. One or more further sets of criteria may be still further different sets of detectors. Preferably the sets of detectors and different overall in terms of the detectors in the set, but one or more detectors may be a member of more than one set. The different sets of criteria may be used to provide spatially sensitive monitoring. The first set of criteria may be used to monitor a location and the second set of criteria may be used to monitor a location. The locations may be different or may be the same, but be monitored in a different way.

The first aspect of the invention may include any of the features, options or possibilities set out elsewhere in this application.

According to a second aspect of the invention we provide a method of monitoring, the method including:
  obtaining a data set, the data set including a record of an event, together with an indication of the time of the event and/or the detector which detected the event;
  processing the data set, the processing including the analysis of at least a part of the data set according to a first set of criteria to provide a first analysed data set.

The criteria may be the application of a mathematical function. The criteria may be the application of a transform, for instance a Fourier transform. The processing may provide a first analysed data set representing the frequency of events and/or signals. One or more features may be obtained from the first analysed data set, for instance a variation with time, such as a cyclic or periodic variation. The feature may be a autocorrelation. The feature may be a cross-correlation. The feature may be a coherent signal or event or variation. The information may relate to variation reoccurring within a time frame of between 1 and 10 seconds. The information may relate to variation reoccurring within a time frame of between 1 and 100 μs.

The method may consider the occurrence of events with time in this way. The method may use spectral analysis.

The method may be used to provide diagnostic information.

The second aspect of the invention may include any of the features, options or possibilities set out elsewhere in this application.

According to a third aspect of the invention we provide a method of monitoring, the method including:
  obtaining a data set, the data set including a record of an event, together with an indication of the time of the event and/or the detector which detected the event;
  processing at least a part of the data set to obtain values for one or more variables at a first time frame within the time period covered by the data set; and
  processing at least a part of the data set to obtain values for one or more variables at a second time frame within the time period covered by the data set;
  considering variation in the value of one or more of the variables between the first time frame and the second time frame.

The variables may be or include the background event level and/or the decay of the radioactive material and/or the coincidence rates and/or a characteristic of the radioactive material.

The time period may be at least a day, more preferably at least 10 days and ideally at least 50 days.

The variation may be used to consider detector performance and/or changes therein and/or process plant performance and/or changes therein.

The variables may be the location and/or activity and/or mass and/or makeup of radioactive material with the monitored space, for instance a process plant. The variables may be the activity and/or mass of radioactive material passing through a location, such as a portal. The variable may increase from a level to a peak and then decrease to a lower level as the radioactive material passes through the location, such as a portal.

The variable may be the number of events and/or count rate for events and/or multiplicity rates. The time frames may reflect different positions, particularly different rotational positions, for an item being monitored. The variation in the variables may provide spatial distribution information on the radioactive material in or associated with the item, such as a drum.

The variable may the number of events and/or count rate for events and/or multiplicity rates for a detector and/or group of detectors. Separate variable values may be obtained for different detectors and/or groups thereof. The values may be used to indicate locations for radioactive material and/or provide probability maps of the radioactive material and/or emission origins.

The first time frame could overlap with the second time frame but be different therefrom. Consecutive time frames may overlap with one another. The first and second and further time frames may progress in a rolling manner. The variable may be the number of events occurring within the time frame. The variable may provide a rolling average. The value may be updated as the time frame is updated.

The third aspect of the invention may include any of the features, options or possibilities set out elsewhere in this application.

The third aspect of the invention may include any of the features, options or possibilities set out elsewhere in this application.

According to a fourth aspect of the invention we provide a method of monitoring, the method including:

obtaining a data set, the data set including a record of an event, together with an indication of the time of the event and/or the detector which detected the event;

processing at least a part of the data set to obtain information on linked events, such as correlated neutrons;

attributing linked events to undesired event detections, such as cosmic events, and removing the linked events from the data set to give a processed data set.

Preferably the linking of events and/or their removal occurs in real time.

The fourth aspect of the invention may include any of the features, options or possibilities set out elsewhere in this application.

According to a fifth aspect of the invention we provide a method of considering an instrument, the method including:

providing an instrument;

obtaining a data set, the data set including a record of an event, together with an indication of the time of the event and/or the detector which detected the event;

applying at least a part of the data set to the instrument and considering the instruments response thereto.

Preferably the method provides for the calibration of the instrument. Preferably the method provides for verification of the instruments performance. The method may be used to consider the instruments response to one or more situations provided from the data set.

The fifth aspect of the invention may include any of the features, options or possibilities set out elsewhere in this application.

BRIEF DESCRIPTION OF THE DRAWINGS

Various embodiments of the invention will now be described, by way of example only, and with reference to the accompanying drawings in which:—

DETAILED DESCRIPTION OF THE PREFERRED EMBODIMENTS

Figure 1A:
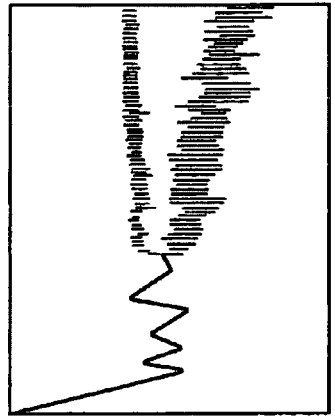
FIGS. 1a, 1b and 1c show plots of the time series, autocorrelation and power spectrum.

Particularly in the context of emissions from radioactive materials, the applicant has provided through WO00/67044 an approach which significantly reduces the amount of hardware necessary to provide monitoring and reduces the influence of noise to render the monitoring more successful.

The applicant has appreciated that the above approach can be built upon to collect and/or process and/or use the body of information collected, with significantly improved possibilities for radioactive material monitoring as a result.

The advantages and possibilities from this approach will first be detailed through a number of specific examples.

Example A

The possession of time and/or location specific information means that processing can be performed based upon a wide variety of different detector setups.

In existing designs the detector arrangements are fixed. Thus the system may have, for instance, 6 detector groups, each including 4 detectors, however, the signals from one group are always considered together.

The present invention allows different arrangements to be formed, before, during and after the monitoring process.

In a first case, the different arrangement is provided by using the same detectors between arrangements, but with the use of different parameters between the different arrangements. Thus, in the context of neutron coincidence counting, variation in one or more parts of the gates is possible. In a first arrangement the gate length could be given a first duration. In a second arrangement the gate length could be of a second duration. The integrated counting probability density functions (pdf's) over the different time intervals would be simultaneously recorded and their distribution analysed to determine the underlying multiplicity. The principal is demonstrated in Demonstration A1 below.

The consideration of different durations allows better precision, potentially through matching the die away time of the chamber plus sample more fully. Information on the moderating effect of the sample may also be obtained. Gate length is one of a number of variables which could be altered between arrangements in this way. Others include the pre-delay, long delay, gate start and stop times in general and the like.

For instance, by considering different start and/or stop times for the real and accidental gate it is possible to define a gate duration which only monitors for real and accidentals and stops when the counts correspond only to accidentals. This improves the accuracy of subsequent determinations based upon the reals rate. In situations where the reals rate is low compared with the accidentals rate, it may even be desirable to reduce the stop time for the gate to the point where some reals are discarded, as in doing so a far larger number of accidentals are discarded and hence the uncertainty in the reals rate is reduced. in a similar manner it is possible to determine the best timing of the accidentals gate such that only accidentals are monitored.

Neutron coincidence counting is also one or a number of general techniques which could be processed with different variable forms in different arrangements. The different arrangements can be processed in parallel with one another, with the best being used to calculate the eventual results.

In a second case, a different approach to the provision of the different arrangement is taken. This time, the timestamp information is reviewed to establish the distribution of the time interval for the various levels of multiplicity event. Thus the time between one signal and the next is used as an indication of a single, the time between one signal and the one after next for a double and so on. This can be repeated for each signal and in respect of as many levels of multiplicity as desired. Analysis of the distributions determines the underlying multiplicity. The principal is demonstrated in Demonstration A2 below.

In a third case, the different arrangement is provided by varying the detectors which are used in the analysis and/or varying the detectors which form groups of detectors which are used in the analysis. Thus in the context of neutron multiplicity counting again, in one arrangement a group of four detectors may be formed, from amongst 40 detectors in the overall system, from detectors 1, 2, 3 and 4. In a second arrangement, the group of four detectors may be formed from detectors 1, 11, 21, 31. Using different detectors to form the groups provides a more sensitive system in general. It also enables sensitivity in respect of certain parts of the space being monitored to be increased preferentially and offers spatial selectivity in the monitoring. This is beneficial where certain parts of the space being monitored, say a corner of a glove box, contain the bulk of the neutron source and so it is desirable to concentrate the investigation thereon.

In a fourth case, the different arrangement is provided by applying different variable values to different detector types. Thus, in the context of neutron coincidence counting, different detector designs or different detector package designs could be used at different locations. The different arrangements come from using one gate length value for one detector type and another different gate length value for another detector type. Again improvements in the precision of the overall instrument could result.

Generation of Data for Demonstrations A1 and A2

Data files were generated to represent pure random singles, doubles and triples. In addition the full multiplicity emissions of $Cf^{252}$ and $Pu^{240}$ were also generated. The system configuration is summarised in Table 1.

TABLE 2-continued

| Sample | Data | Multiplicity Index - 0 | Multiplicity Index - 1 | Multiplicity Index - 2 |
|---|---|---|---|---|
| 4 | Average | 304.16 | 80.99 | 11.59 |
|  | Standard Dev | 1.96 | 1.48 | 0.85 |
| 5 | Average | 529.49 | 253.59 | 68.29 |
|  | Standard Dev | 2.72 | 4.32 | 3.51 |
| Background | Average | 1.08 | — | — |
|  | Standard Dev | 0.06 | — | — |

To allow proper comparison between existing approaches and the new arrangements, this data was normalised with respect to the double and triple frequencies; these are the multiplicity frequency per gate trigger; Table 3.

TABLE 3

| Sample | Data | Multiplicity Index - 1 | Multiplicity Index - 2 |
|---|---|---|---|
| 1 | Average | 0.0001 | 0.0005 |
|  | Standard Dev | 0.0003 | 0.0014 |
| 2 | Average | 0.1507 | 0.0014 |
|  | Standard Dev | 0.0027 | 0.0004 |
| 3 | Average | 0.3005 | 0.0305 |
|  | Standard Dev | 0.0035 | 0.0023 |
| 4 | Average | 0.2663 | 0.0381 |
|  | Standard Dev | 0.0046 | 0.0028 |
| 5 | Average | 0.4789 | 0.1289 |
|  | Standard Dev | 0.0065 | 0.0062 |
| Background | Average |  |  |
|  | Standard Dev |  |  |

Demonstration A1

To consider the data files using different gates, the different gates were defined and then applied to the data to establish the

TABLE 1

| System ID | Description | Efficiency | Count Rate | Die Away time | Gate Length | Predelay | Long Delay | Dead time | BGD event rate | Record mode |
|---|---|---|---|---|---|---|---|---|---|---|
| WDAS | WDAS test system | 30.00% | 100 | 0.000048 s | 0.000064 s | 0.000005 s | 0.004 s | 0.000001 s | 1 | 1 |

The efficiency and die away times are consistent with normal systems. The deadtime was set at this level to see whether any of the proposed methods were unduely sensitive to this parameter.

The multiplicity rates were obtained from the data files by the standard consideration of gates corresponding to the real and accidental counts, R+A, and to the accidentals only count, A. The results are detailed in Table 2.

TABLE 2

| Sample | Data | Multiplicity Index - 0 | Multiplicity Index - 1 | Multiplicity Index - 2 |
|---|---|---|---|---|
| 1 | Average | 142.01 | 0.02 | 0.02 |
|  | Standard Dev | 1.13 | 0.04 | 0.02 |
| 2 | Average | 283.03 | 42.64 | 0.41 |
|  | Standard Dev | 1.20 | 0.89 | 0.12 |
| 3 | Average | 423.76 | 127.36 | 12.91 |
|  | Standard Dev | 2.75 | 1.96 | 1.00 | number of events falling within that gate. The counts are accumulated into frequency registers. This gives R+A and A histograms.

Whilst these can be deconvoluted individually to produce multiple R vectors, in this instance the set of R+A histograms are modelled using a single equation giving the gate response probability distribution frequency as a function of time. For doubles, and assuming the die away time is $\tau$ then the measured pdf $fRA_t$ of R+A events at time t is modelled as the addition of fR(t) and fA probability terms:

$$fRA_t = fR \cdot \exp\left(\frac{t}{\tau}\right) + fA$$

The terms fR(0) and fA are obtained by regression analysis.

Demonstration A2

When the pulses are detected, the time is noted by the time stamper. From this recording of the times, it is possible to obtain the differences for the time stamper values of successive pulses and provide a histogram or other distribution indication of the times observed. Full variation in the way the distribution is broken up into time bins is possible. More detailed information on the distribution of neutron events is thus provided. The same concept can be extended to various multiplicity levels, doubles, triples etc.

The frequency histogram, fRA, of real+accidental events (R+A) accumulated into unit time bins, t, for multiplicities n=0 . . . N is derived from the recorded frequency distribution (normalised to sum to unity) of waiting times fTIA according to:

$$fRA_{t,0} := 1 - \left[\sum_{s=0}^{t} fTIA_{s,0}\right]$$

$$N := 1 \ldots N$$

$$fRA_{t,n} := 1 - \sum_{s=0}^{t} fTIA_{s,n} \sum_{m=0}^{n-1} fRA_{t,m}$$

where $fTIA_{s,n}$ is the normalised frequency (probability) of waiting for a time s for the nth subsequent multiplicity event.

Because of the detailed nature of the interval methods, it is possible to deconvolve the measured Rossi-Alpha profile and thereby obtain a better time resolution than the natural system die away time.

The deconvolution fRA' of an fRA histogram accumulated using the method with a die away time (resolution) of t is obtained by dividing the respective transforms and taking the inverse transform of the result. In order to suppress the noise associated with the process, it is possible to include an additional filter, potentially of the Weiner type, which may be obtained or estimated from the power spectrum.

$$fRA' := IFFT\left[\frac{\Phi, FRT(fRA)}{FRT(\rho)}\right]$$

where
FFT is the Finite Fourier Transform;
IFFT is the inverse transform; and
$\Phi$ is the Weiner filter.

Results for Demonstrations A1 and A2 Against Existing Approach

The results obtained by applying the multiple gates of different time periods—demonstration A1—and by applying the multiple intervals—demonstration A2—are compared with the existing approach in Table 4.

TABLE 4

| Sample | Data | Paired gates | Multiple Gates | Multiple Intervals |
|---|---|---|---|---|
| 1 - singles | Average | 0.0001 | −0.0007 | −0.0007 |
|  | Standard Dev | 0.0003 | 0.0012 | 0.0011 |
| 2 - doubles | Average | 0.1507 | 0.1477 | 0.1432 |
|  | Standard Dev | 0.0027 | 0.0031 | 0.0032 |
| 3 - triples | Average | 0.3005 | 0.2942 | 0.2855 |
|  | Standard Dev | 0.0035 | 0.0024 | 0.0022 |

TABLE 4-continued

| Sample | Data | Paired gates | Multiple Gates | Multiple Intervals |
|---|---|---|---|---|
| 4 - $Pu^{240}$ | Average | 0.2663 | 0.2602 | 0.2528 |
|  | Standard Dev | 0.0046 | 0.0038 | 0.0039 |
| 5 - $Cf^{252}$ | Average | 0.4789 | 0.4661 | 0.4519 |
|  | Standard Dev | 0.0065 | 0.0056 | 0.0053 |

Particularly in relation to cases 3, 4 and 5 the multiple gate and multiple interval methods represent significant improvements. In the other cases performance is as good as or close to the prior art approach.

Example B

This approach considers the signals expressed in a fundamentally different way to that used before. Instead of considering the time for signals, that information is used to transform the data set into one representing the frequency for the signals. Handling the information in this way enables features to be discerned and used which are not apparent from the time expression of the data. The features can provide useful information on plant operation, drum rotation etc on one scale and, on a short timescale, indications on various nuclear physics processes.

The principal is demonstrated below in Demonstration B1 which makes use of the same type of generated data fed to Demonstration A1 and Demonstration A2 above.

In the demonstration of Demonstration B2, the application of approach in the context of diagnostics is shown.

Demonstration B1

Transformation of the signal from the time into the frequency domain may allow certain features that would otherwise not be visible, such as auto and cross correlations between various portions of the signal to be extracted. On a longer timescale (approx 1-10 s) sources of coherent signals could include process operations, waste drum rotations and the like. On shorter timescales (approx 10-100 µs) sources of coherence could include multiplication or reactor noise effects. Extraction of coherent signals from large data sets can be accomplished by Fourier transformation. Analysis methods for determination of correlation and power spectra are also possibilities. Autocorrelation will identify when the observed signal is not random and will indicate the form of the underlying signal. Spectral analysis will quantify various frequency components present within the signal. the power spectrum P and autocorrelation R of, for example, a real signal S is given by $$P(\vec{S}) := (|FFT(S)|)^2$$

$$R(S) := IFFT(P(S))$$

where IFFT is the inverse transform.

Demonstration B2

The usefulness of the application of transformations to data sets is illustrated with reference to FIGS. 1a, 1b and 1c and with reference to FIGS. 2a, 2b and 2c.

Figure 1B:
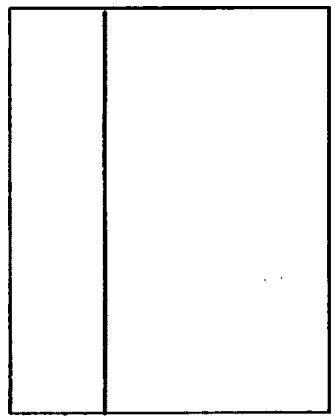
Figure 1C:
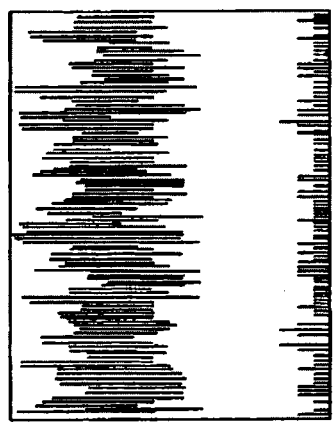
Figure 2A:
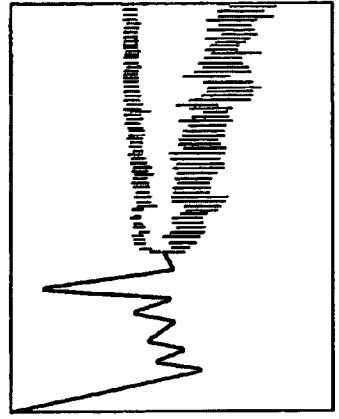
FIGS. 2a, 2b and 2c show the same plots but with the addition of a sinusoidal variation in efficiency of ±50% with a period of $2\pi$.
Figure 2B:
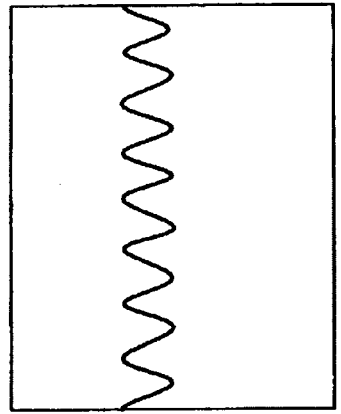
Figure 2C:
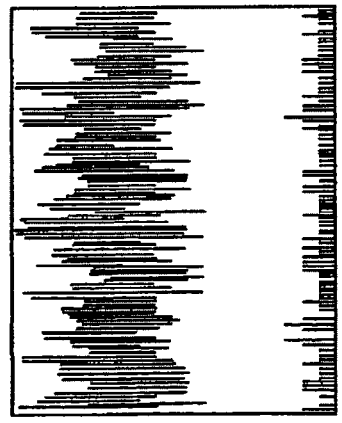

FIG. 1a shows the data set sorted into 0.01 s bins. FIG. 1b shows the autocorrelation function plotted over a lag of 0 to 50 seconds. FIG. 1c shows the power spectrum. No trends are readily apparent from these presentations of the data set. However, the application of modulation with a sine factor of period $2i$ seconds improves the results. In the case of FIG. 2a, no apparent benefit is obtained as this result is indistinguishable from that of FIG. 1a. However, the effect on the FIGS. 2b and 2c plots is that the factor allows them to reveal information not recognisable from FIG. 1b or 1c. The sinusoidal variation are now readily apparent in the FIG. 2b autocorrelation function plot and the frequency and power are derivable from the peak in the power plot, FIG. 2c. Such a data set might arise from a rotating drum, with the transformation revealing the significant underlying pattern. The pattern could indicate heterogeneous distribution of sources in the drum—where there is significant variation with rotation—or homogeneous distribution—where there is no significant variation during rotation.

Transformations of this type could also be used to reveal underlying patterns relevant to diagnostic issues.

Example C

The possession of time and/or location specific information means that historical information can be considered to extract a range of useful further information and indications. Considerations in this area may be assisted by the type of transformation referred to in Example B above.

A benefit of this approach is that it is possible to consider how a number of issues vary with time. Such issues include the variation of decay with time, the variation and/or extent of background signals with time and the like. Such considerations can be important in the context of standardisation issues, performing different algorithm comparisons on data and/or trend monitoring. Variations can be over a fairly short time scale or days/weeks. For instance, the approach may be used to consider detector performance variation and/or plant variation.

Example D

In existing approaches, a single correction factor is applied to the signals an instrument is concerned with. The information on the specific detector the signal arose from in the present approach allows for channel specific correction factors to be applied.

In the context of neutron coincidence counting, therefore, it is possible to apply individual corrections to individual detectors. This could be based upon a consideration of the count history and hence dead time history for that detector. This is of particular use as accurate deadtime correction is important in considering higher multiplicities effectively.

In an extension of this approach, where signals vary with time, for instance due to movement of the material being considered, then correction factors which also vary with time can be applied. For neutron coincidence counting on a drum which is rotated, the variation in deadtime is linked to the rotation and hence the correction applied can be synchronised with the rotation too. Thus the non-linear nature of deadtime correction can be acknowledged and a more accurate correction applied.

Example E

The consideration of signals from detectors of known position is useful in determining the location and activity of radioactive materials within an environment, as well as the total material measurement.

Such an approach can be used to monitor material handling plant as a whole or sections thereof. This offers benefits in plant or area monitoring applications, as discussed in Demonstration E1 below.

Additionally, the use of such signals in a passive neutron counting system to monitor a drum which is rotated, can potentially be used to provide information on the spatial distribution of emitters within the drum. The neutron count time information is considered together with information on the rotation of the drum, for instance by means of the turntable rotation sensor output. The neutron signal of a source should be represented by a sinusoidal variation in the signal, see Demonstration B2 above. Analysis of this variation can be used to suggest a source distribution for the emitter in the drum.

The present invention offers the potential to apply a more generalised approach to the consideration of signals detected by instruments. Again neutron coincidence counting is used, with the address of a detector being known for a neutron coincidence event detected. The spatial response function for the detectors involved is also known. From the combined data a probability map for the origins of that neutron can be generated. By doing this for each of a large number of neutrons and combining the results, the source distribution within the environment can be obtained. The counting efficiency for the detector array to this particular distribution can then be used to reach the mass of material in the sample result, with consequential improvement compared with the use of a global figure which was previously used irrespective of where the source position was suggested to be. The principal is demonstrated in more detail in Demonstration E2 below.

Demonstration E1

When considering a plant, detectors can be positioned at selected locations so as to inform on material within the plant and/or the movement of such material through the plant. This is based on changes in the detected counts with time. Thus a first detector X may be positioned on a process stream A leading to process unit B. Further detectors Y and Z respectively may be provided on process streams C and D which lead away from process unit B. When the count with time information is considered, the passage of a batch of material past detector X gives an increase from a level as the material passes, followed by a return to that level after the material passes. A similar situation occurs for detectors Y and Z after the processing. The relative levels of the increase for Y and Z can inform on the split. The relative levels can also indicate material hold up in the process unit B where the Y and Z information does not balance with the X information.

Demonstration E2

The approach is used to consider a waste crate disposed between a number of neutron detectors. In this specific example, 6 groups each of four detectors are provided, but the principle is applicable if different numbers of groups and different numbers of detectors within those groups.

Using the existing fixed approach, the number of measurable quantities is limited to 31 count rates–6 detector units×4 detectors in each, individual count rates, +6 detector units, unit count rates, +1 overall system, system count rate. This limits the number of discrete sources of emissions within the environment that can have their spatial positions determined to 7 in theory and 2 or 3 in practice.

Under the new approach, each possible detector can be paired with each other detector, so giving 288 possible count rates for pairs and up to 17 million distinct configurations. Whilst not all detector pairings will be useful, the additional data is most useful. The data level might even be sufficiently high to replace the discrete representation of neutron distribution with a continuous representation.

Example F

Particularly in the context of neutron counting based techniques, cosmic events are known to have an impact on accuracy. The impact is potentially greater in some instrument types than others, but is more significant for all instruments, where those are operated at higher elevations and the shielding provided by the atmosphere is reduced as a result.

Presently, the counts monitored are considered in blocks/segments and those blocks/segments having high multiplicities are discarded completely.

In the present invention, correlated groups of neutrons can be considered as they arise, by virtue of their time stamp data, with multiplicities arising from cosmic events being discarded in real time.

Example G

Validation of the fundamental approach, hardware operation and software operation are key aspects of any new instrument design. They are important not only to ensure the instrument is as accurate as possible, but also to convince regulators of the validity of the approach. New checks are periodically demanded by regulators. Attempts have been made to simulate the types and sequences of emissions an instrument will encounter, but the statistics of the process (randomness and time intervals) are difficult to simulate. Verification is frequently performed by trying the instrument out in actual measurements, but with the source position, activity etc. know. Such validations and similar procedures used for calibration purposes are time consuming to perform.

By virtue of the time and sequence information possessed on signals, the historical data can be used as feed data to a verification and/or calibration process. The approach also allows the characteristics arising from deadtime to be presented to the instrument or alternatively allows deadtime to be measured and addressed in that way.

Additionally, or alternatively, and in the context of a well characterised source, the level of data obtained by the instrument for such a source can be compared with information from the previous characterisation of that source to establish whether the instrument generates false signals, and if it does the nature and potentially origin of those false signals. Improved knowledge of the instrument's response is obtained as a result.

On a similar basis, the historical information can be used to assist in development work and/or diagnostic work, where a body of realistic data is required.

Example H

Present instruments perform a variety of calculations based upon the count arising within a certain period. A value is generated and the calculation moves on to the next period. starting again. As the time sequence information for all the detectors is known in the present invention, however, the calculation could be based upon the count arising in a period of given length, up to that point in time. A rolling average would thus be used, rather than a series of fixed values. Improved accuracy should result. Such an approach could be used in a system such as the applicant's FISSTRACK® instrument.

Example I

In a number of situations, existing instruments are used to indicate the presence of an emitting material at a location. Portal monitors in particular are used for this purpose.

The present invention, by virtue of the time information obtained, can provide greater information on the material's movement. Thus a neutron emitting material approaching and passing a portal monitor will produce a signal which increases with time, peaks and then decreases with time. Information on the material's passage and at the time of its actually passing the portal monitor is obtained. A series of detectors could be considered together, with the signals and peaks for each informing on the time of passage of the material relative to each.

Example J

The additional information the present invention provides also offers additional possibilities in the area of active neutron consideration.

In a first instance, it is possible to use a pulsed neutron generator to introduce neutrons to an item. An array of detectors (fast and/or thermal) according to the invention detects these neutrons after their passage through the item and includes information on the time of detection. The time of detection compared with the time of the neutron pulse gives important information on the passage of the neutrons through the item. Depending upon the circumstances of the situation being investigated, the measurements may be supplemented by passive neutron detection (such as reactor noise) and/or source jerk measurements.

In an extension of this active neutron approach, it is possible to use a neutron pulse generator to introduce neutrons into an item, such as the ground, the reflected neutron waves can then be detected at known positions and at known times relative to the pulse generator position and the time of the pulse. Reflecting layers and/or objects within the area investigated may thus be revealed.

The use of spatially sensitive neutron detectors is also possible. The neutron pulse from the generator is detected upon arrival at the detector and is discriminated relative to background noise and the like by fast neutron coincidence of the neutron detector output with the neutron generator control pulse. Tomographic reconstruction algorithms, online or offline, could be used to create images from the detected information.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All; changes which come within the meaning and range of equivalency of the claims are to be embraced within their scope.

What is claimed is:

1. A method of monitoring emissions from radioactive decay, the method comprising:
   providing an instrument, the instrument including a plurality of detectors for detecting emissions from radioactive decay;
   obtaining a data set using the instrument, the data set including a record of an emission event, together with an indication of the time of the emission event and the detector which detected the emission event, the data set including a plurality of such records from the plurality of detectors; and
   processing the data set by:
      analysing at least a part of the data set according to a first set of criteria to provide a first analysed data set, the first set of criteria including a first length of time between an emission event and the start of a time period, the time period being the time period providing a count of real and accidental coincidence emission events; and analysing at least a part of the data set according to a second set of criteria to provide a second analysed data set, one or more criteria of the second set being different to the criteria of the first set, the second set of criteria being different to the criteria of the first set by providing a different length of time between an emission event and the start of the time period, the time period being the time period providing a count of real and accidental coincident emission events.

2. The method according to claim 1 in which one or more of the criteria are the time between an occasion and the start of the time period and/or the time between an occasion and the end of the time period and/or the time period between the start of the time period and the end of the time period.

3. The method according to claim 1 in which the first set of criteria includes a first length of time between the start of a time period and the end of a time period and the second set of criteria includes a second different length of time between the start of the time period and the end of the time period.

4. The method according to claim 3 in which the first time period is a measure of the real and accidental coincidences in the events, with the second time period being a measure of the accidental coincidences.

5. The method according to claim 4 in which the distribution of the number of events falling within the time periods is considered.

6. The method according to claim 1 further comprising:
reviewing the first analysed data set and the second analysed data set; and
selecting one of the analysed data sets in preference to the other, the set of criteria for the selected data set being selected to give a length of time period which excludes times at which only accidental coincidences occur.

7. The method according to claim 1 further comprising:
reviewing the first analysed data set and the second analysed data set; and
selecting one of the data sets in preference to the other, the set of criteria for the selected data set being selected to give a length of time period which excludes times for which real coincidences occur below a threshold rate.

8. The method according to claim 1 in which
the first set of criteria is the time between an event and an event which is n events later, where n is a positive integer and
the second set of criteria is the time between an event and an event which is m events later, where m is a positive integer and is different to n.

* * * * *